April 11, 1961 P. ROSSI 2,978,975
APPARATUS FOR COOKING FARINACEOUS MATERIALS
Filed Nov. 10, 1958 4 Sheets-Sheet 2
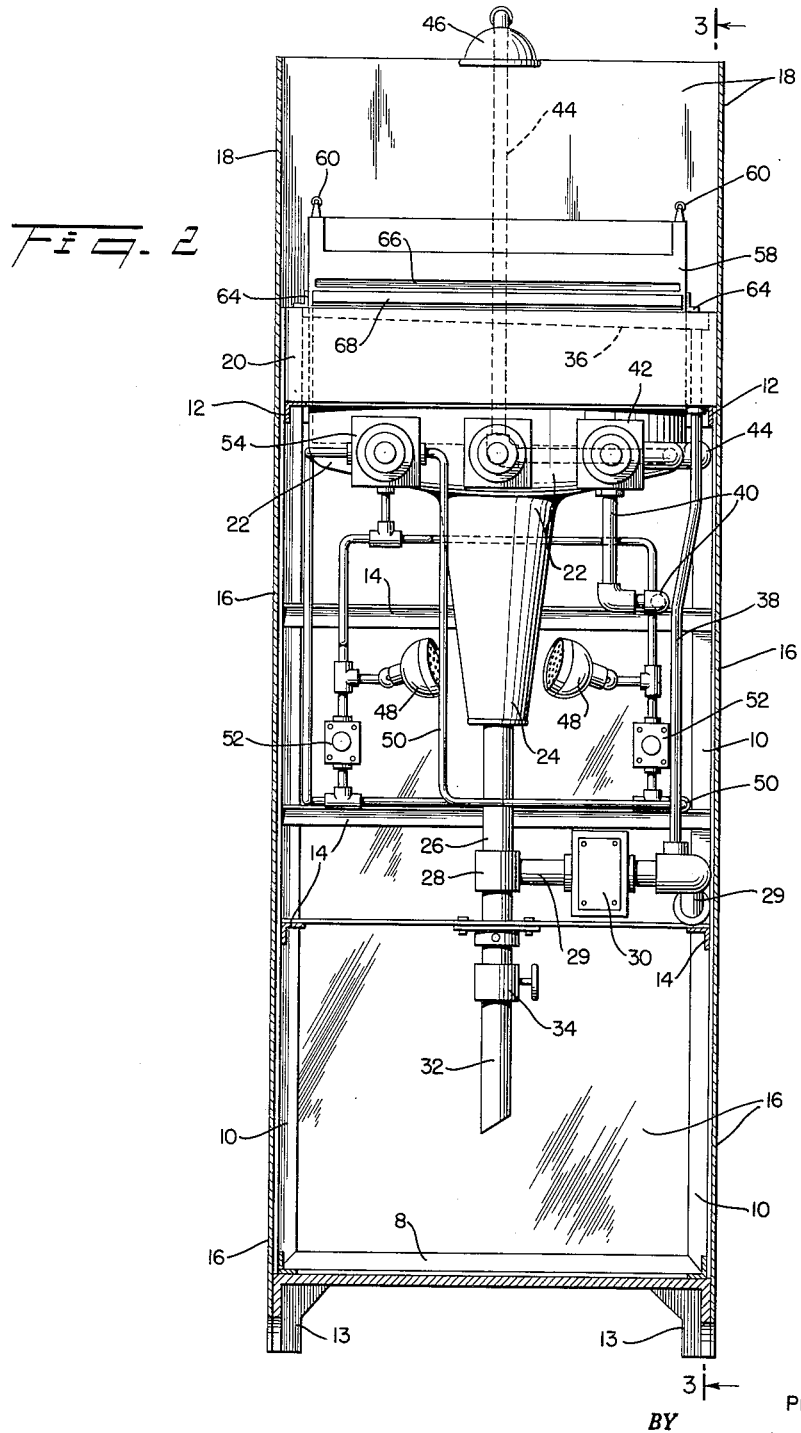
*INVENTOR.*
PETER ROSSI
BY
Robert E. Isner
ATTORNEY

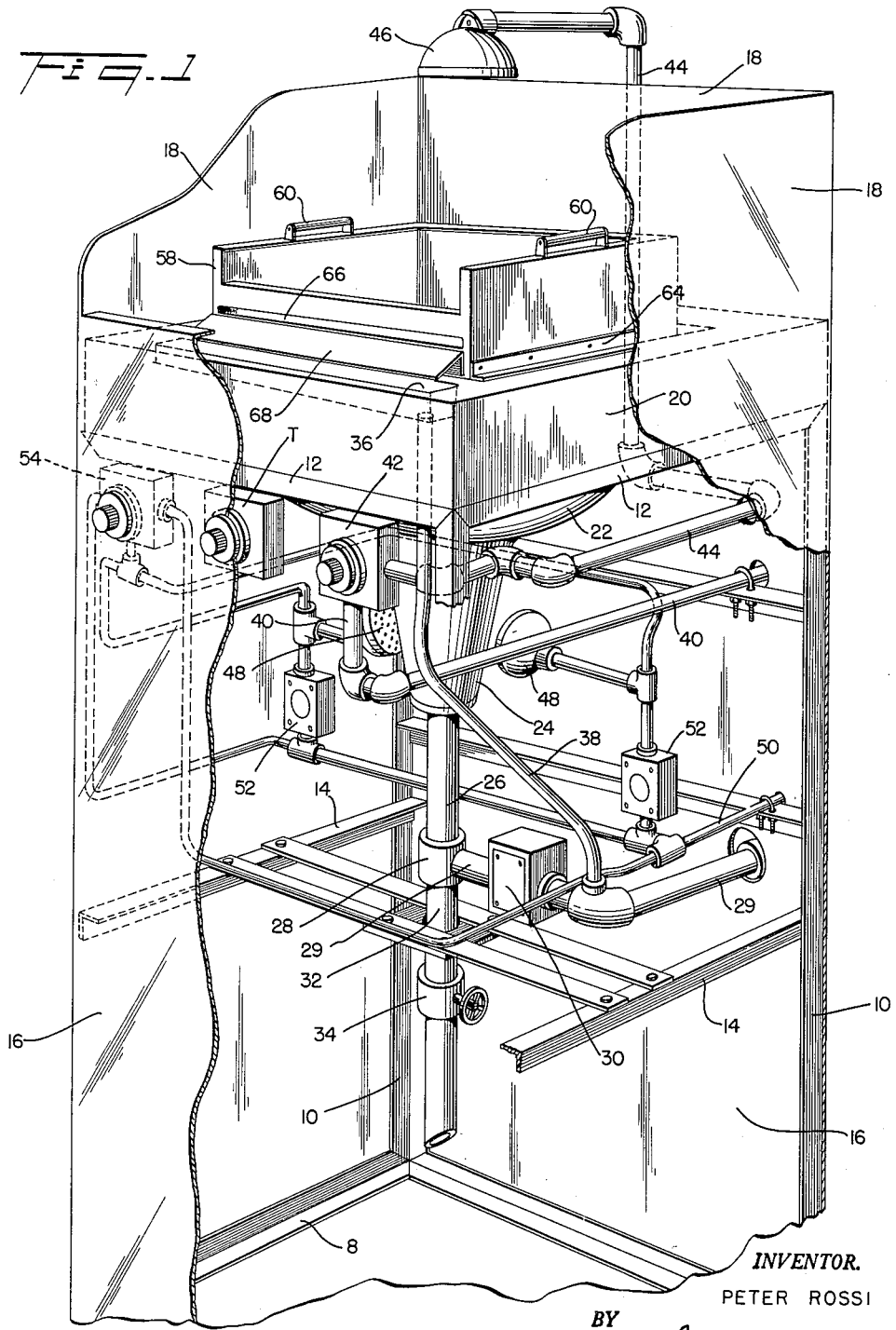

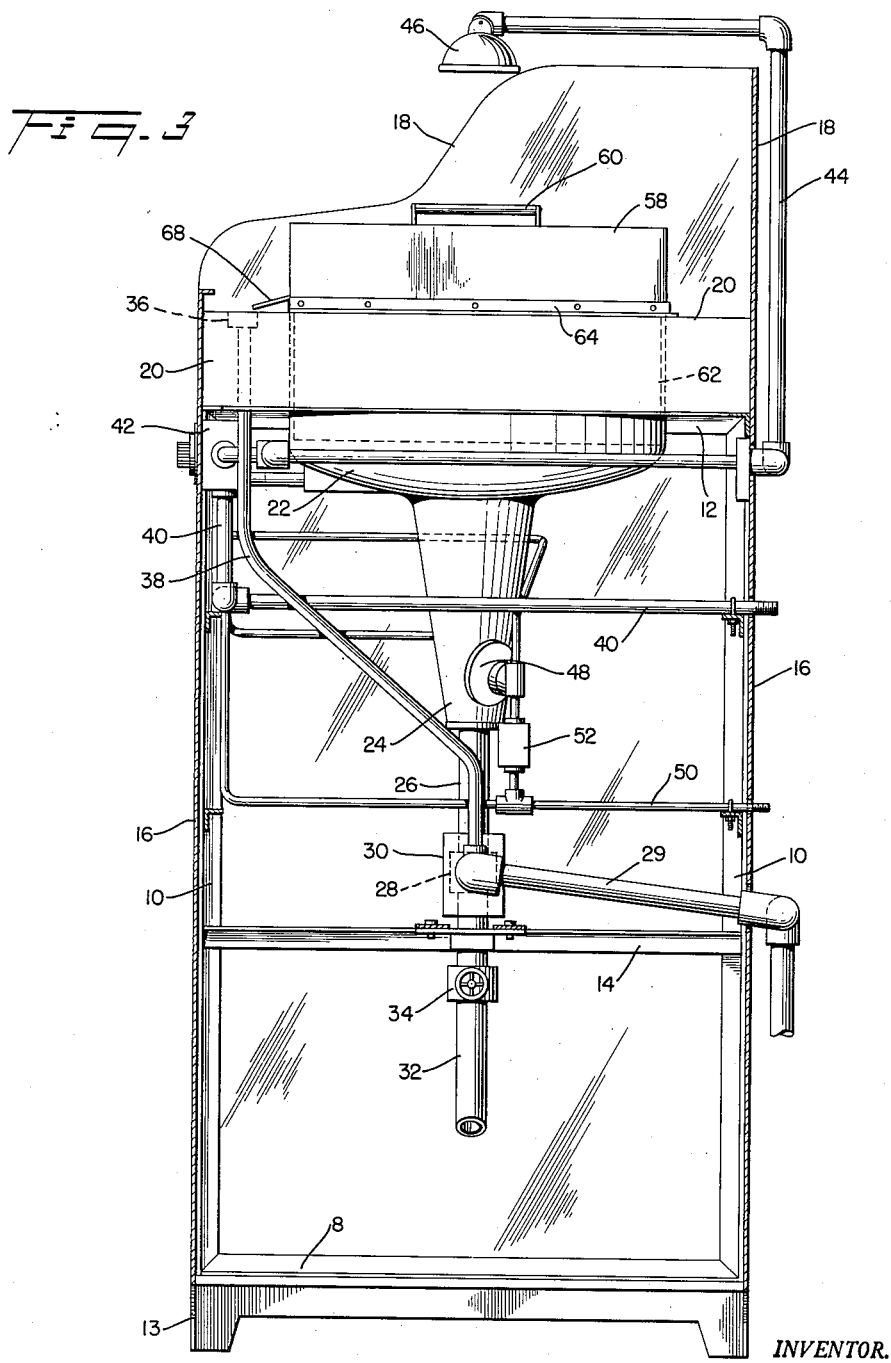

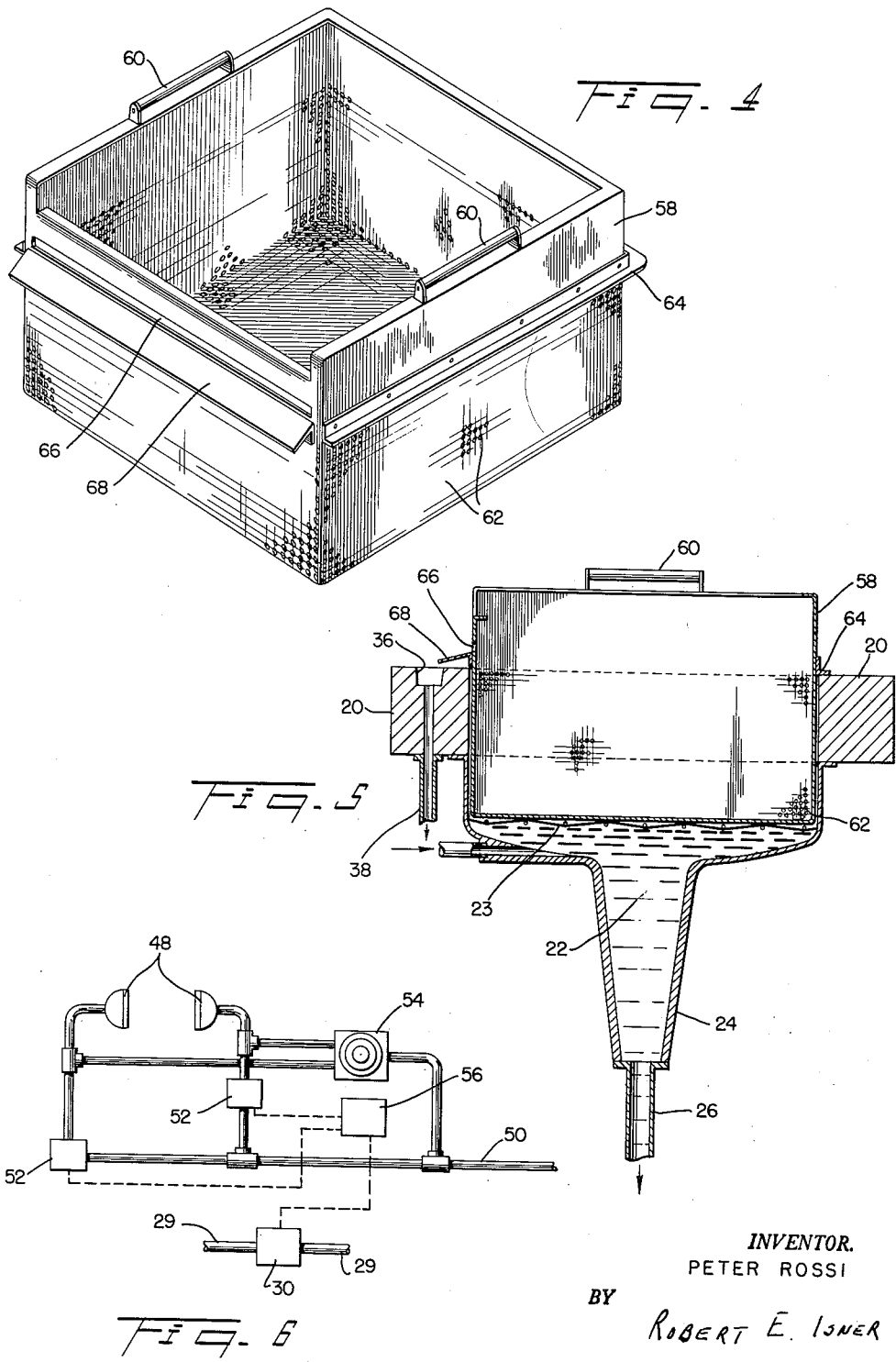

United States Patent Office 2,978,975
Patented Apr. 11, 1961

2,978,975
APPARATUS FOR COOKING FARINACEOUS MATERIALS

Peter Rossi, Pocono Gardens Lodge, Cresco, Pa.

Filed Nov. 10, 1958, Ser. No. 772,952

4 Claims. (Cl. 99—330)

This invention relates to the cooking of farinaceous materials and particularly to an improved apparatus for the automatically controlled cooking of spaghetti and like food products for restaurants or other eating establishments.

The required time for effecting the cooking of edible spaghetti is dependent primarily upon the character of the spaghetti being cooked, ranging from about seven minutes for the thinner types up to about eleven or more minutes for the heavier types. In addition to the above, the cooking time, for any given type of spaghetti, is also dependent upon the desired "hardness" or "softness" of the cooked product in accordance with the personal taste requirements of the consumer thereof with this variant being in the nature of a relatively small time interval that is either added or subtracted from the approximate cooking times set forth above. Departures from a predetermined desired cooking time for a given type of spaghetti result in a product which may be either overcooked or undercooked or, if sufficiently cooked, one that is not in accordance with the personal taste requirements of the consumer. Conventional practice in restaurants or other eating places where relatively large quantities of spaghetti are served usually involves quantity cooking or precooking which, as a practical matter, usually precludes even a close approach to the above described desirable cooking requirements and in most cases actually results in a greatly overcooked product.

Apart from the cooking times as discussed above, the palatable quality of the cooked product is determined at least in part by the amount of starch laden cooking liquid adhering to the product at the time of serving thereof.

Conventional practices in restaurants or other eating establishments where large quantities of spaghetti are served usually preclude the removal of starch from the cooking liquid during the cooking cycle or removal of the starch-laden cooking liquid from the surface of the product after the removal of the product from the cooking vessel. The net result of the conventional practices, dictated in the main by equipment and kitchen personnel considerations, is a product which, while edible, usually falls far short of the palatability that could be obtained by removal of the starch-laden liquid from the product surface.

I have found that the palatability of the finished product may be greatly improved by providing for the continuous removal of the starchy froth that accumulates on the surface of the cooking liquid during the cooking process and the removal of the excess starch-laden liquid from the product surface by a rinsing of the cooked product immediately after completion of a desired cooking cycle and separation of the product from the cooking liquid.

This invention may be briefly described as an improved cooking apparatus for the automatic cooking of spaghetti and like products in accordance with the character of the product and the taste requirements of the consumer and which includes means for increasing the palatability of the cooked product by automatic removal of the starchy froth that accumulates on the surface of the cooking liquid and by removal of the starch-laden cooking liquid from the surface of the cooked product immediately after completion of the predetermined cooking cycle and separation of the cooked product from the cooking liquid.

Among the advantages attendant the herein disclosed invention are the permitted presetting, by the kitchen personnel, of a cooking cycle in accordance with predetermined standards so as to automatically result in a cooked product in accord with the specified taste requirements of the consumer, thereby removing the estimation of cooking periods from the kitchen personnel and freeing the kitchen personnel for other cooking operations during the cooking cycle with a resultant increase in kitchen efficiency, the provision of a cooked product of improved palatability in accordance with predetermined standards and the permitted preparation and cooking of spaghetti on a substantially individual order basis with a minimum of time required therefor for restaurants or other eating establishments.

The object of this invention is the provision of an improved automatically operable spaghetti cooking apparatus.

Other objects and advantages of the invention herein disclosed will be pointed out in the following disclosure and claims and will be illustrated in the accompanying drawings which disclose, by way of example, the principles underlying the invention and a presently prepared embodiment incorporating those principles and by which said principles may be usefully employed in the cooking of spaghetti and other farinaceous materials.

Referring to the drawings:

Figure 1 is an oblique view, partially in section, of the presently preferred embodiment of the cooking apparatus incorporating the principles of the invention;

Figure 2 is a front sectional view of the apparatus illustrated in Figure 1;

Figure 3 is a sectional view as taken on the line 3—3 of Figure 2;

Figure 4 is an oblique view of a removable spaghetti cooking container;

Figure 5 is an enlarged sectional view of a portion of the apparatus;

Figure 6 is a schematic simplified view of the gas and drain control system.

Referring to the drawings and particularly to Figures 1, 2 and 3 thereof, there is provided a boxlike frame structure formed of a rectangularly shaped base section 8, vertical post members 10 extending upwardly from the corners thereof and a rectangularly shaped top portion 12 of a size coincident with that of the base section. The above described frame structure is provided with suitable legs 13 and reinforcing members 14 disposed intermediate the vertical posts 10 and in substantially parallel relationship with the base and top sections 8 and 12, respectively. The above described frame structure is preferably formed of suitable corrosion resisting framing material such as stainless steel or aluminum angle irons. The reinforced frame structure as above described is externally enclosed with suitable corrosion resistant metal sheet material 16 formed of the above mentioned metals or of enameled low carbon steel to provide an externally pleasing appearance. The sheet materials 16 disposed on the side and rear wall portions of the frame are provided with upwardly directed extended portions 18 which serve to define a generally U-shaped upwardly and forwardly open work area enclosure surrounding the top frame section 12 and the operating table 20 mounted thereon.

Mounted on the top of the frame section 12 and disposed within the work area enclosure defined by the extended wall portions 18 is a table member 20 having a centrally disposed boiling well 22 dependent from the upper surface thereof. In the illustrated embodiment the upwardly directed open end of the well 22 is shown as being rectangular in shape, although any desired configuration may be employed. The well 22 is provided with a dependent end portion 24 of greatly reduced cross sectional area terminating in an axially disposed drain pipe 26. As illustrated, the drain pipe 26 is connected through a T-type coupling 28 and piping 29, which includes a solenoid actuated valve 30, to a sewer or other waste disposal system externally of the unit. Preferably, and as also shown in the drawings, an auxiliary drain pipe 32 containing a manually operable valve 34 is connected to the T-type coupling 28 to facilitate cleaning of the drain pipe 26. As best shown in Figure 5, the well 22 contains a removable grid 23 conveniently supported by the inwardly directed portion of the well wall structure at the initial point of reduction of diameter thereof.

The table member 20 is also provided with an elongate starch drain trough 36 preferably disposed adjacent and parallel to the front endge of well 22 and connected, as by a drain line 38, to the main drain line 29 downstream from the solenoid actuated valve 30

The required water for the cooking and other necessary operations is introduced into the unit by the water supply or intake pipe 40 which is preferably connected to an externally disposed supply of hot water. As will become apparent to those skilled in the art, in view of the following descriptive material, the intake water as supplied by the pipe 40 should be as hot as possible in order to reduce the time required to raise the same to the boiling temperature and to prevent any undesired reduction in temperature of the cooked material during the hereinafter described rinsing operation. The water intake pipe 40 is connected to a manually operable water control valve 42 which is so constructed as to selectively permit a user (a) to shut off all water intake or (b) to introduce hot water into the well 22, or (c) to introduce hot water into the rinsing system which, as illustrated, includes the piping 44 and the shower head 46 disposed above the boiling well 22.

Disposed in proximity to the dependent end portion 24 of the boiling well 22 are a plurality of gas burners 48 positioned so as to throw their flame against said dependent end portion 24 of said well and to heat the contents thereof. The burners 48 are connected by suitable piping to a gas supply line 50 through timer controlled individual solenoid actuated valves 52 and are further connected to the supply line 50 through a manually operable control valve 54 whereby the burners may be operated independently of the timer controlled solenoid actuated valves 52 as schematically illustrated in Figure 6.

The unit also includes a manually settable master timing unit 56 (Figure 6) arranged, after expiration of a present time interval to (a) automatically close the solenoid actuated valves 52 and thereby automatically cut off the flow of gas to the burners 48 and (b) to automatically open the normally closed solenoid actuated value 30 contained in the drain line 29 so as to permit rapid draining of the liquid in the boiling well simultaneousy with the shutting off of the gas burners 48.

Referring now to Figure 4, there is also provided a manually removable cooking container for the spaghetti. As there illustrated, it preferably consists of a trough member 58 shaped and sized to be insertable into the well 22 to be positioned therein above the grid 23 and provided with a pair of lifting handles 60. The trough 58 has the lower portions thereof perforated, as at 62, over its entire surface. Disposed on the outside of the trough member 58 are retaining or positioning lip members 64 which are sized to engage the upper surface of the table 20 adjacent the well 22 and thereby limit the depth of immersion of the trough 58 in the well 22. The front of the trough member 58 is provided with an elongate slot 66 adapted to be disposed parallel to and slightly above the surface of the cooking water liquid contained in the boiling well 22 when the trough member is positioned therein. Disposed adjacent to the slot 66 is a downwardly projecting drainboard 68 having its dependent end disposed in overlying relationship with the recess 36 in the table 20 for directing the starchy froth on the surface of the cooking water which passes through said slot 66 into the aforementioned trough 36.

In operation of the above described unit the solenoid actuated gas line valves 52 and the drain valve 30 are normally closed and the well 22 is empty prior to the start of the cooking operation. Upon receipt of an order for spaghetti, the cook will manipulate the water control valve 42 so as to effect introduction of the hot intake water into the well 22 to fill the same to the desired level. As mentioned earlier, it is desirable to have this intake water at as high a temperature as is practicable. Coincidentally therewith or immediately thereafter, the manual gas control valve 54 is operated so as to ignite or increase the flame output of the burners 48 to apply heat to the dependent end portion 24 of the well 22 in order to raise the cooking water within the well to a rapid boil. As will be apparent to those skilled in the art, the higher the temperature of the intake water, the shorter the period of time that will be required to raise the same to the boiling temperature. Attention is also directed at this time to the preferred application of heat to the reduced portion 24 of the well 22 which serves to markedly increase the agitation effects in the boiling liquid and insures a positive rotational water flow within the well from the center outwardly, which results in increased starchy froth production and displacement of the froth toward the periphery of the trough 58 and the slot 66 therein.

After the water in the well 22 has been raised to the boiling temperature, a desired quantity of uncooked spaghetti is placed in the spaghetti container 58 and the same is placed into the well with the product to be cooked under the surface of the rapidly boiling liquid. Immediately subsequent thereto the timer 56 is set by the cook for a predetermined desired cooking time in accordance with the character of the particular spaghetti being cooked and the desired degree of hardness or softness in accordance with the purchaser's desires. Setting of the timer 56 results in an automatic opening of the solenoid valves 52 in the gas lines to the burners 48 and, after manual shut off of the valve 54, places said burners 48 wholly under the control of the timing unit. The cooking of the spaghetti can then proceed for the preset time cycle without further attention of the cooking personnel thereby freeing them for other kitchen operations.

As mentioned earlier the application of heat to the reduced dependent end portion 24 of the well 22 results in an extremely rapid and agitative boiling of the cooking liquid. This rapid boiling results in continual circulation of the liquid and in a greatly increased production of a starchy froth on the surface of the water in the boiling well 22. The rapid boiling coupled with the above described location of the slot 66 in the container 58 results in a removal of said froth from the liquid surface and in an introduction of the same, together with some of the cooking liquid, into the drain trough 36 and through the pipe 38 into the drainage system. The continual removal of this starchy froth during the entire cooking cycle apparently results in a lowered starch concentration within the cooking liquid.

The cooking operation will continue under control of the automatic timer 56 until the preset cooking cycle is completed. At this time an attention arresting alarm such as a bell, not shown, will sound, the solenoid valves 52 will automatically close shutting off the burners 48 and the drain valve 30 will automatically open, permitting a rapid draining of the cooking liquid from the well 22 and the now cooked spaghetti contained in the trough 58.

Due to the continuous removal of the starchy froth, as described above, the rapid draining of the cooking liquid from the well 22 results in only minimal quantities of the starchy froth being disposed in engagement with the surface of the cooked product. At the above described time point, the cook, whose attention was obtained by the alarm, will return to the unit, manually operate the water control valve 42 so as to selectively cause water to flow through the rinsing system, i.e. the pipes 44 and shower head 46, so as to rinse the cooked spaghetti with hot water and remove, from the surface thereof, any remaining quantity of starch-laden liquid or frothy material. This manually controlled rinsing operation need be only of short duration and additionally serves to rinse the well 22 and trough 58. At the conclusion thereof the solenoid valve 30 in the drain system is reset to close the same and the unit is ready for another cooking operation as described above. The rinsed spaghetti in the trough 58 is a product cooked in strict accordance with the time required by the character thereof and as required by the personal taste requirements of the consumer and, moreover, is of improved palatability due to the effective removal of all starch-laden cooking liquid therefrom.

As will be apparent to those skilled in the art the above described apparatus can be of widespread utility in restaurants or other eating establishments and its use, in addition to resulting in a product of improved patentability, frees kitchen personnel for other duties during the cooking cycle.

Having thus described my invention, I claim:

1. Apparatus for the controlled cooking of farinaceous materials comprising an upwardly open ended cooking liquid well having a dependent end portion of reduced cross-sectional area and dependently terminating in a valved drain, a removable perforate cooking container mounted in the upper and enlarged portion of said well sized to have the major portion thereof disposed beneath the operative liquid level therein for containing the material to be cooked, heating means disposed externally adjacent the dependent end portion of said well for raising the temperature of the cooking liquid in said well to the boiling point and for effecting a flow of boiling cooking liquid upwardly substantially along the longitudinal axis of said well and outwardly towards the periphery thereof and timing means operative after expiration of a presettable time interval to open said valved drain and to de-activate said heating means.

2. The apparatus as set forth in claim 1 wherein said container includes an elongate froth drain disposed closely adjacent the operative liquid level in said well for permitting starchy froth accumulating on the surface of said cooking liquid during boiling thereof to be displaced exteriorly thereof and including auxiliary drain means positioned disposed externally adjacent to said cooking liquid well to receive said displaced froth passing through said elongate froth drain in said container.

3. The apparatus as set forth in claim 1 including cooked material rinsing means disposed above said well and valve means for effecting the selective introduction of rinsing liquid into said rinsing means.

4. Apparatus for the controlled cooking of farinaceous materials comprising an upwardly open ended cooking liquid well having an axially disposed dependent end portion of reduced cross-sectional area and an enlarged upper portion sized to receive and contain a removable cooking container beneath the operative liquid level therein, a valved drain connected to the dependent end of said well, a rinsing head disposed above said well, liquid valve means for effecting the selective introduction of cooking liquid into said well or into said rinsing head, heating means for selectively applying heat to the external surfaces of the dependent end portion of said well to raise cooking liquid contained therein to the boiling point and effect a flow of said boiling liquid from the longitudinal axis of said well outwardly toward the periphery thereof and timing means operative after expiration of a presettable time interval to automatically open said valved drain and to deactivate said heating means.

References Cited in the file of this patent

UNITED STATES PATENTS

| | | |
|---|---|---|
| 1,264,740 | Young | Apr. 30, 1918 |
| 2,544,153 | Hall | Mar. 6, 1951 |
| 2,825,666 | Stoddard | Mar. 4, 1958 |
| 2,849,944 | Prickett | Sept. 2, 1958 |